(12) United States Patent
Hipp et al.

(10) Patent No.: US 11,755,401 B2
(45) Date of Patent: Sep. 12, 2023

(54) SYSTEM AND METHOD FOR CONTROLLING POWER GRID CONNECTION OF POWER CONSUMPTION ENTITY USING AN ANALYTICAL ARTIFACT

(71) Applicant: SIEMENS AKTIENGESELLSCHAFT, Munich (DE)

(72) Inventors: Ulrich Hipp, Munich (DE); Christof Kaukewitsch, Munich (DE); Marc Zeller, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1077 days.

(21) Appl. No.: 16/155,933

(22) Filed: Oct. 10, 2018

(65) Prior Publication Data
US 2019/0108084 A1   Apr. 11, 2019

(30) Foreign Application Priority Data
Oct. 11, 2017 (EP) ...................... 17195964

(51) Int. Cl.
*G05B 23/02* (2006.01)
*G06F 11/07* (2006.01)
*G06F 11/00* (2006.01)
*G05B 17/02* (2006.01)
*G06Q 10/0635* (2023.01)

(52) U.S. Cl.
CPC ............ *G06F 11/079* (2013.01); *G05B 17/02* (2013.01); *G05B 23/0248* (2013.01); *G05B 23/0278* (2013.01); *G06F 11/008* (2013.01); *G06Q 10/0635* (2013.01); *G05B 2219/23447* (2013.01)

(58) Field of Classification Search
None
See application file for complete search history.

(56) References Cited

U.S. PATENT DOCUMENTS

| 7,200,525 B1 * | 4/2007 | Williams ............. G06F 11/008 714/E11.02 |
| 2004/0215569 A1 * | 10/2004 | Agha ...................... G06F 21/73 705/57 |
| 2008/0034258 A1 * | 2/2008 | Moriya ............. G05B 23/0297 714/57 |

(Continued)

FOREIGN PATENT DOCUMENTS

EP   3151122 A1   4/2017

OTHER PUBLICATIONS

Extended European Search Report dated Apr. 26, 2018 for Application No. 17195964.6.

(Continued)

*Primary Examiner* — Bernard G Lindsay
(74) *Attorney, Agent, or Firm* — Schmeiser, Olsen & Watts LLP

(57) ABSTRACT

A method for providing an analytical artifact used for development and/or analysis of an investigated technical system of interest comprised of components having associated machine readable functional descriptions including port definitions and component failure modes processed to generate automatically the analytical artifact in response to at least one applied system evaluation criterion.

17 Claims, 31 Drawing Sheets

(56) References Cited

U.S. PATENT DOCUMENTS

| | | | |
|---|---|---|---|
| 2008/0276206 A1* | 11/2008 | Mariani | G06F 11/2252 716/136 |
| 2009/0113248 A1* | 4/2009 | Bock | G06F 11/0748 714/39 |
| 2013/0024417 A1* | 1/2013 | Joanni | G06N 7/005 706/59 |
| 2013/0205170 A1* | 8/2013 | Bluvband | G05B 23/0248 714/E11.029 |
| 2015/0019187 A1* | 1/2015 | Jones | G06F 30/20 703/8 |
| 2015/0046761 A1* | 2/2015 | Messer | G06F 11/00 714/710 |
| 2015/0067400 A1* | 3/2015 | Ishii | G06F 11/0706 714/37 |
| 2015/0095101 A1* | 4/2015 | Kymal | G06F 30/00 705/7.28 |
| 2015/0142402 A1* | 5/2015 | Ramesh | G05B 23/0248 703/7 |

OTHER PUBLICATIONS

Extended European Search Report for related Application No. 17195964.6; dated Apr. 26, 2018; 8 pages.

* cited by examiner

FIG 4

Table 1: Power Supply Fire Sensor (Generic And Instantiation)

| | | |
|---|---|---|
| 1 | Power Supply Fire Sensor (generic) | extern |
| 2 | Inputs | Outputs |
| 3 | Input 1 | Output 1 |
| 4 | irrelevant | <voltage level, quality, criteria> |

5

| | | |
|---|---|---|
| 6 | Power Supply Fire Sensor (instantiation) | extern |
| 7 | Inputs | Outputs |
| 8 | Input 1 | Output 1 |
| 9 | irrelevant | 5V +- 10% |
| 10 | irrelevant | not (5V +- 10%) |

FIG 5

Table 2: Power Supply CPU (Generic And Instantiation)

| | | |
|---|---|---|
| 1 | Power Supply Fire Sensor (generic) | extern |
| 2 | Inputs | Outputs |
| 3 | Input 1 | Output 1 |
| 4 | irrelevant | <voltage level, quality, criteria> |

5

| | | |
|---|---|---|
| 6 | Power Supply Fire Sensor (instantiation) | extern |
| 7 | Inputs | Outputs |
| 8 | Input 1 | Output 1 |
| 9 | irrelevant | 5V +- 10% |
| 10 | irrelevant | not (5V +- 10%) |

FIG 6A

Table 3: Fire Sensor (Generic and Instantiation)

| | | | |
|---|---|---|---|
| 2 | Fire sensor (generic) | Intern | |
| 3 | Inputs | | |
| 4 | Input 1 (IR signal) | Input 2 (Power Supply) | internal state |
| 5 | irrelevant | not (5V +- 10%) | irrelevant |
| 6 | irrelevant | 5V +- 10% | Internal failure detected |
| 7 | IR present | 5V +- 10% | No internal failure detected |
| 8 | IR not present | 5V +- 10% | No internal failure detected |
| 9 | IR present | 5V +- 10% | No internal failure detected |
| 10 | IR not present | 5V +- 10% | No internal failure detected |
| 11 | irrelevant | 5V +- 10% | No internal failure detected |
| 12 | irrelevant | 5V +- 10% | No internal failure detected |
| 13 | | | |
| 14 | | | |
| 15 | | | |
| 16 | Fire Sensor S1, type: | | |
| 17 | Fire Sensor (generic) | Intern | |
| 18 | Inputs | | |
| 19 | Input 1 (IR signal) | Input 2 (Power Supply) | internal state |
| 20 | irrelevant | not (5V +- 10%) | irrelevant |
| 21 | irrelevant | 5V +- 10% | Internal failure detected |
| 22 | IR present | 5V +- 10% | No internal failure detected |
| 23 | IR not present | 5V +- 10% | No internal failure detected |
| 24 | IR present | 5V +- 10% | No internal failure detected |
| 25 | IR not present | 5V +- 10% | No internal failure detected |
| 26 | irrelevant | 5V +- 10% | No internal failure detected |
| 27 | irrelevant | 5V +- 10% | No internal failure detected |
| 28 | | | |
| 29 | | | |

FIG 6B

| Failure mode | Failure Rate | Preventive maintenance activity |
|---|---|---|
| no | n.a. | Inspect, clean. all |
| various | 500 | Inspect, clean. all |
| no | n.a. | Inspect, clean. all |
| no | n.a. | Inspect, clean. all |
| missed detection | 100 | Inspect, clean. all |
| false alarm | 500 | Inspect, clean. all |
| no output signal | 50 | Inspect, clean. all |
| deviation of output signal | 150 | Inspect, clean. all |
|  | 1300 |  |
|  | Sum |  |

| Failure mode | Failure Rate | Preventive maintenance activity |
|---|---|---|
| no | n.a. | Inspect, clean. all |
| various | 500 | Inspect, clean. all |
| no | n.a. | Inspect, clean. all |
| no | n.a. | Inspect, clean. all |
| missed detection | 100 | Inspect, clean. all |
| false alarm | 500 | Inspect, clean. all |
| no output signal | 50 | Inspect, clean. all |
| deviation of output signal | 150 | Inspect, clean. all |
|  | 1300 |  |
|  | Sum |  |

FIG 6C

|  |  |
|---|---|
|  | Outputs |
| Corrective maintenance activity | Output |
| Exchange component | no signal |
| Exchange component | "Internal failure fire sensor", coded, repeated |
| Exchange component | "Fire", coded, repeated |
| Exchange component | "No fire", coded, repeated |
| Exchange component | "No fire", coded, repeated |
| Exchange component | "Fire", coded, repeated |
| Exchange component | no signal |
| Exchange component | deviating signal (none of the above coded signals) |

|  |  |
|---|---|
|  | Outputs |
| Corrective maintenance activity | Output 1 |
| Exchange component | no signal |
| Exchange component | "Internal failure fire sensor", coded, repeated |
| Exchange component | "Fire", coded, repeated |
| Exchange component | "No fire", coded, repeated |
| Exchange component | "No fire", coded, repeated |
| Exchange component | "Fire", coded, repeated |
| Exchange component | no signal |
| Exchange component | deviating signal (none of the above coded signals) |

FIG 7A

Table 4: CPU (Generic and Instantiation)

| 2 | CPU (generic) | Intern | |
|---|---|---|---|
| 3 | Input 1 | Input 2 | Input 3 |
| 4 | <Power> | <Digital signal, voltage range X> | <Digital signal, voltage range X> |
| 5 | not (5V +- 10%) | irrelevant | irrelevant |
| 6 | 5V +- 10% | irrelevant | irrelevant |
| 7 | 5V +- 10% | <Digital signal, voltage range X> | <Digital signal, voltage range X> |
| 8 | 5V +- 10% | <Digital signal, voltage range X> | <Digital signal, voltage range X> |
| 9 | 5V +- 10% | <Digital signal, voltage range X> | <Digital signal, voltage range X> |
| 10 | 5V +- 10% | <Digital signal, voltage range X> | <Digital signal, voltage range X> |
| 11 | 5V +- 10% | <Digital signal, voltage range X> | <Digital signal, voltage range X> |

12
13
14

| 15 | CPU (instantiation) type: | | |
|---|---|---|---|
| 16 | CPU (generic) | Intern | |
| 17 | Input 1 | Input 2 | Input 3 |
| 18 | <Power> | <Digital signal, voltage range X> | <Digital signal, voltage range X> |
| 19 | not (5V +- 10%) | irrelevant | irrelevant |
| 20 | 5V +- 10% | irrelevant | irrelevant |
| 21 | 5V +- 10% | "No fire", coded, repeated | "No fire", coded, repeated |
| 22 | 5V +- 10% | Not ("No fire", coded, repeated) | irrelevant |
| 23 | 5V +- 10% | irrelevant | Not ("No fire", coded, repeated) |
| 24 | 5V +- 10% | Not ("No fire", coded, repeated) | irrelevant |
| 25 | 5V +- 10% | irrelevant | Not ("No fire", coded, repeated) |
| 26 | 5V +- 10% | "No fire", coded, repeated | "No fire", coded, repeated |
| 27 | 5V +- 10% | Not ("No fire", coded, repeated) | irrelevant |
| 28 | 5V +- 10% | irrelevant | Not ("No fire", coded, repeated) |

| Internal state | Failure mode | Failure rate |
|---|---|---|
| <status indication> | <description> | n.a. |
| irrelevant | no | n.a. |
| internal failure mode detected | various | 1000 |
| No internal failure detected | no | n.a. |
| No internal failure detected | Output 1 signal faulty | 100 |
| No internal failure detected | Output 2 signal faulty | 100 |
| No internal failure detected | Output 3 signal faulty | 100 |
| No internal failure detected | Common cause failure | 250 |
| | | 1550 |
| | | Sum |

| Internal state | Failure mode | Failure rate |
|---|---|---|
| <status indication> | <description> | n.a. |
| irrelevant | no | n.a. |
| internal failure mode detected | various | 1000 |
| No internal failure detected | no | n.a. |
| No internal failure detected | no | n.a. |
| No internal failure detected | no | n.a. |
| No internal failure detected | Output 1 signal faulty | 50 |
| No internal failure detected | Output 1 signal faulty | 50 |
| No internal failure detected | Output 1 signal faulty | 50 |
| No internal failure detected | Common cause failure | 25 |
| No internal failure detected | Common cause failure | 25 |
| | | 1200 |
| | | Sum |

FIG 7C

| Preventive maintenance activity | Corrective maintenance activity |
|---|---|
| | |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |

| Preventive maintenance activity | Corrective maintenance activity |
|---|---|
| | |
| Inspect, clean, all | Exchange fuse, if not successful: exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |

FIG 7D

| MDT [h] with overhead | Output 1 |
|---|---|
| | <Digital signal, voltage range X> |
| 0,1 | no signal |
| 0,5 | no signal |
| 0,5 | Built from logic on inputs and internal state |
| 0,5 | Deviation from built-in logic on inputs and internal state |
| 0,5 | |
| 0,5 | |
| 0,5 | Deviation from built-in logic on inputs and internal state |

| MDT [h] | Output 1 |
|---|---|
| | <Digital signal, voltage range X> |
| 1,1 | no signal (=LOW="OPEN" OR "LEAVE OPEN") |
| 1,5 | no signal (=LOW="OPEN" OR "LEAVE OPEN") |
| 1,5 | HIGH signal (CLOSE) |
| 1,5 | no signal (=LOW="OPEN" OR "LEAVE OPEN") |
| 1,5 | no signal (=LOW="OPEN" OR "LEAVE OPEN") |
| 1,5 | HIGH signal (CLOSE) |
| 1,5 | HIGH signal (CLOSE) |
| 1,5 | no signal (=LOW="OPEN" OR "LEAVE OPEN") |
| 1,5 | HIGH signal (CLOSE) |
| 1,5 | HIGH signal (CLOSE) |

FIG 7E

| |
|---|
| Output 2 |
| <Digital signal, voltage range X> |
| no signal |
| no signal |
| Built from logic on inputs and internal state |
| |
| Deviation from built-in logic on inputs and internal state |
| |
| Deviation from built-in logic on inputs and internal state |
| |
| unused |
| Output 2 |
| <Digital signal, voltage range X> |
| irrelevant |
| irrelevant |
| irrelevant |
| irrelevant |
| irrelevant |
| irrelevant |
| irrelevant |
| irrelevant |
| irrelevant |
| irrelevant |

FIG 7F

| |
|---|
| Output 3 (status) |
| <Digital signal, voltage range X> |
| no signal |
| "Interal failure CPU", coded, repeated |
| "No interal CPU failure detected", coded, repeated |
| |
| |
| Deviation from built-in logic on inputs and internal state |
| Deviation from built-in logic on inputs and internal state |
| |
| |
| unused 2 |
| Output 3 (status) |
| <Digital signal, voltage range X> |
| irrelevant |
| irrelevant |
| irrelevant |
| irrelevant |
| irrelevant |
| irrelevant |
| irrelevant |
| irrelevant |
| irrelevant |
| irrelevant |

FIG 8A

Table 5: Actuator Generic

| | Actuator, simplified (generic) | Intern | no programming capability | | |
|---|---|---|---|---|---|
| 1 | Input 1 | Internal state | Failure mode | Failure rate | Preventive maintenance activity |
| 2 | <Digital signal, voltage range X>: LOW | Output closed | no | n.a. | Inspect and test |
| 3 | <Digital signal, voltage range X>: LOW | Output open | no | n.a. | Inspect and test |
| 4 | <Digital signal, voltage range X>: HIGH | Output closed | no | n.a. | Inspect and test |
| 5 | <Digital signal, voltage range X>: HIGH | Output open | no | n.a. | Inspect and test |
| 6 | <Digital signal, voltage range X>: LOW | Output closed | Sleeping fault: unable to open | 100 | Inspect and test |
| 7 | <Digital signal, voltage range X>: LOW | Output open | Sleeping fault: unable to open | 100 | Inspect and test |
| 8 | <Digital signal, voltage range X>: HIGH | Output closed | Sleeping fault: unable to open | 100 | Inspect and test |
| 9 | <Digital signal, voltage range X>: HIGH | Output open | Sleeping fault: unable to open | 100 | Inspect and test |
| 10 | <Digital signal, voltage range X>: LOW | Output closed | Sleeping fault: unable to open | 70 | Inspect and test |
| 11 | <Digital signal, voltage range X>: LOW | Output open | Sleeping fault: unable to open | 70 | Inspect and test |
| 12 | <Digital signal, voltage range X>: HIGH | Output closed | Sleeping fault: unable to open | 70 | Inspect and test |
| 13 | <Digital signal, voltage range X>: HIGH | Output open | Sleeping fault: unable to open | 70 | Inspect and test |
| 14 | <Digital signal, voltage range X>: HIGH | Output closed | opens uncommandedly | 200 | Inspect and test |
| 15 | <Digital signal, voltage range X>: LOW | Output open | closes uncommandedly | 150 | Inspect and test |
| 16 | | | | 1030 | |
| 17 | | | | Sum | |

FIG 8B

| Inspection interval [h] | Corrective maintenance activity | MDT [h] without overhead | Output 1 | Fault detection |
|---|---|---|---|---|
| 300 | Replace defect element | 8 | Open | n.a |
| 300 | Replace defect element | 8 | Remains open | n.a |
| 300 | Replace defect element | 8 | Remains closed | n.a |
| 300 | Replace defect element | 8 | Close | n.a |
| 300 | Replace defect element | 8 | Open | no |
| 300 | Replace defect element | 8 | Remains open | no |
| 300 | Replace defect element | 8 | Remains closed | no |
| 300 | Replace defect element | 8 | Remains open | yes |
| 300 | Replace defect element | 8 | Remains closed | yes |
| 300 | Replace defect element | 8 | Remains open | no |
| 300 | Replace defect element | 8 | Remains closed | no |
| 300 | Replace defect element | 12 | Close | no |
| 300 | Replace defect element | 12 | Close | yes |
| 300 | Replace defect element | 12 | Close | yes |

FIG 9A

Table 6: Actuator Instantiation

| | Actuator instantiation of type: | | | | |
|---|---|---|---|---|---|
| 22 | Actuator, simplified (generic) | | | | |
| 23 | Input 1 | Intern | no programming capability | | |
| | | Internal state | Failure mode | Failure rate | Preventive maintenance activity |
| 24 | <Digital signal, voltage range X>: LOW | Output closed | no | n.a. | Inspect and test |
| 25 | <Digital signal, voltage range X>: LOW | Output open | no | n.a. | Inspect and test |
| 26 | <Digital signal, voltage range X>: HIGH | Output closed | no | n.a. | Inspect and test |
| 27 | <Digital signal, voltage range X>: HIGH | Output open | no | n.a. | Inspect and test |
| 28 | <Digital signal, voltage range X>: LOW | Output closed | Sleeping fault: unable to close | 100 | Inspect and test |
| 29 | <Digital signal, voltage range X>: LOW | Output open | Sleeping fault: unable to close | 100 | Inspect and test |
| 30 | <Digital signal, voltage range X>: HIGH | Output closed | Sleeping fault: unable to close | 100 | Inspect and test |
| 31 | <Digital signal, voltage range X>: HIGH | Output open | Sleeping fault: unable to close | 100 | Inspect and test |
| 32 | <Digital signal, voltage range X>: LOW | Output closed | Sleeping fault: unable to open | 70 | Inspect and test |
| 33 | <Digital signal, voltage range X>: LOW | Output open | Sleeping fault: unable to open | 70 | Inspect and test |
| 34 | <Digital signal, voltage range X>: HIGH | Output closed | Sleeping fault: unable to open | 70 | Inspect and test |
| 35 | <Digital signal, voltage range X>: HIGH | Output open | Sleeping fault: unable to open | 70 | Inspect and test |
| 36 | <Digital signal, voltage range X>: HIGH | Output closed | opens uncommandedly | 200 | Inspect and test |
| 37 | <Digital signal, voltage range X>: LOW | Output open | closes uncommandedly | 150 | Inspect and test |
| 38 | | | | 1030 | |
| 39 | | | | Sum | |

FIG 9B

| Inspection interval [h] | Corrective maintenance activity | MDT [h] without overhead | Output 1 | Fault detection |
|---|---|---|---|---|
| 300 | Replace defect element | 16 | Open | n.a |
| 300 | Replace defect element | 16 | Remains open | n.a |
| 300 | Replace defect element | 16 | Remains closed | n.a |
| 300 | Replace defect element | 16 | Close | n.a |
| 300 | Replace defect element | 16 | Open | no |
| 300 | Replace defect element | 16 | Remains open | no |
| 300 | Replace defect element | 16 | Remains closed | no |
| 300 | Replace defect element | 16 | Remains open | yes |
| 300 | Replace defect element | 16 | Remains closed | yes |
| 300 | Replace defect element | 16 | Remains open | no |
| 300 | Replace defect element | 16 | Remains closed | no |
| 300 | Replace defect element | 16 | Close | no |
| 300 | Replace defect element | 20 | Open | yes |
| 300 | Replace defect element | 20 | Close | yes |

FIG 10A

Table 7. Actuator: Relevant States Safety Criterion 1

| | Actuator instantiation of type: | | | | |
|---|---|---|---|---|---|
| 21 | | | | | |
| 22 | Actuator, simplified (generic) | Intern | | no programming capability | |
| 23 | Input 1 | Internal state | Failure mode | Failure rate | Preventive maintenance activity |
| 26 | <Digital signal, voltage range X>: HIGH | Output closed | no | n.a. | Inspect and test |
| 27 | <Digital signal, voltage range X>: HIGH | Output open | no | n.a. | Inspect and test |
| 32 | <Digital signal, voltage range X>: LOW | Output closed | Sleeping fault: unable to open | 70 | Inspect and test |
| 37 | <Digital signal, voltage range X>: LOW | Output open | closes uncommandedly | 150 | Inspect and test |

FIG 11A

Table 8: CPU: Relevant States Safety Criterion 1

| | CPU (instantiation) type: | | | | | |
|---|---|---|---|---|---|---|
| 15 | | | | | | |
| 16 | CPU (generic) | Intern | | | | |
| 17 | Input 1 | Input 2 | Input 3 | Internal state | Failure mode | |
| 21 | 5V +- 10% | "No fire'", coded, repeated | "No fire'", coded, repeated | No internal failure detected | no | |
| 24 | 5V +- 10% | Not ("No fire", coded, repeated) | irrelevant | No internal failure detected | Output 1 signal faulty | |
| 25 | 5V +- 10% | irrelevant | Not ("No fire", coded, repeated) | No internal failure detected | Output 1 signal faulty | |
| 27 | 5V +- 10% | Not ("No fire", coded, repeated) | irrelevant | No internal failure detected | Common cause failure | |
| 28 | 5V +- 10% | irrelevant | Not ("No fire", coded, repeated) | No internal failure detected | Common cause failure | |

FIG 10B

| Inspection interval [h] | Corrective maintenance activity | MDT [h] without overhead | Output 1 | Fault detection |
|---|---|---|---|---|
| 300 | Replace defect element | 16 | Remains closed | n.a |
| 300 | Replace defect element | 16 | Close | n.a |
| 300 | Replace defect element | 16 | Remains closed | yes |
| 300 | Replace defect element | 20 | Close | yes |

FIG 11B

| Failure rate | Preventive maintenance actifity | Corrective maintenance activity | MDT [h] | Output 1 | unused Output 2 | unused 2 Output 3 (status) |
|---|---|---|---|---|---|---|
| n.a | Inspect, clean, all | Exchange component | 1,5 | HIGH signal (CLOSE) | irrelevant | irrelevant |
| 50 | Inspect, clean, all | Exchange component | 1,5 | HIGH signal (CLOSE) | irrelevant | irrelevant |
| 50 | Inspect, clean, all | Exchange component | 1,5 | HIGH signal (CLOSE) | irrelevant | irrelevant |
| 25 | Inspect, clean, all | Exchange component | 1,5 | HIGH signal (CLOSE) | irrelevant | irrelevant |
| 25 | Inspect, clean, all | Exchange component | 1,5 | HIGH signal (CLOSE) | irrelevant | irrelevant |

FIG 12A

Table 9: Fire Sensor S1: Relevant State Safety Criterion 1

| | | | | | |
|---|---|---|---|---|---|
| 16 | Fire Sensor S1, type: | | | | |
| 17 | Fire Sensor (generic) | intern | | | |
| | Inputs | | | | |
| 24 | IR present | 5V +−10% | No internal failure detected | missed detection | 100 | Inspect, clean, all | Exchange component |

FIG 13A

Table 10: Actuator: Relevant States Reliability Criterion 2

| | | | | | | |
|---|---|---|---|---|---|---|
| 21 | Actuator instantiation of type: | | | | | |
| 22 | Actuator, simplified (generic) | Intern | | no programming capability | | |
| 23 | Input 1 | Internal state | Failure mode | Failure rate | Preventive maintenance activity |
| 24 | <Digital signal, voltage range X>: LOW | Output closed | no | n.a. | Inspect and test |
| 30 | <Digital signal, voltage range X>: HIGH | Output closed | opens uncommandedly | 200 | Inspect and test |

FIG 12B

| Spalte 8 |
|---|
| Outputs |
| "No fire", coded, repeated |

FIG 13B

| Inspection interval [h] | Corrective maintenance activity | MDT [h] with overhead | Output 1 | Fault detection |
|---|---|---|---|---|
| 300 | Replace defect element | 16 | Open | n.a |
| 300 | Replace defect element | 20 | Open | yes |

FIG 14A

Table 11: CPU: Relevant States Reliability Criterion 2

| 15 | CPU (instantiation) type: | | | | |
|----|---------------------------|-------|-------|-------|-------|
| 16 | CPU (generic) | Intern | | | |
| 17 | Input 1 | Input 2 | Input 3 | Internal state | Failure mode |
| 18 | <Power> | <Digital signal, voltage range X> | <Digital signal, voltage range X> | <status indication> | <description> |
| 19 | not (5V +- 10%) | irrelevant | irrelevant | irrelevant | no |
| 20 | 5V +- 10% | irrelevant | irrelevant | internal failure mode detected | various |
| 22 | 5V +- 10% | Not ("No fire", coded, repeated) | irrelevant | No internal failure detected | no |
| 23 | 5V +- 10% | irrelevant | Not ("No fire", coded, repeated) | No internal failure detected | no |
| 26 | 5V +- 10% | "No fire", coded, repeated | "No fire", coded, repeated | No internal failure detected | Output 1 signal faulty |

FIG 14B

| Failure rate | Preventive maintenance actifity | Corrective maintenance activity | MDT [h] |
|---|---|---|---|
| n.a | | | |
| n.a | Inspect, clean, all | Exchange fuse, if not successful: exchange component | 1,1 |
| 1000 | Inspect, clean, all | Exchange component | 1,5 |
| n.a | Inspect, clean, all | Exchange component | 1,5 |
| n.a | Inspect, clean, all | Exchange component | 1,5 |
| 50 | Inspect, clean, all | Exchange component | 1,5 |

FIG 14C

| Output 1 | unused<br>Output 2 | unused 2<br>Output 3 (status) |
|---|---|---|
| <Digital signal, voltage range X> | <Digital signal, voltage range X> | <Digital signal, voltage range X> |
| no signal (=LOW ="OPEN" OR "LEAVE OPEN") | irrelevant | irrelevant |
| no signal (=LOW ="OPEN" OR "LEAVE OPEN") | irrelevant | irrelevant |
| no signal (=LOW ="OPEN" OR "LEAVE OPEN") | irrelevant | irrelevant |
| no signal (=LOW ="OPEN" OR "LEAVE OPEN") | irrelevant | irrelevant |

FIG 15A

Table 12: Fire Sensor C1: Relevant States Reliability Criterion 2

| 16 | Fire Sensor S1, type: | intern | | | |
|---|---|---|---|---|---|
| 17 | Fire Sensor (generic) | intern | | | |
| 18 | Inputs | Input 2 (Power Supply) | Internal state | Failure mode | Failure rate |
| 21 | Input 1 (IR signal) | 5V +- 10% | Internal failure detected | various | 500 |
| 25 | irrelevant | 5V +- 10% | No internal failure detected | false alarm | 500 |
| 26 | IR not present | 5V +- 10% | No internal failure detected | no output signal | 50 |
| 27 | irrelevant | 5V +- 10% | No internal failure detected | deviation of output signal | 150 |

FIG 15B

| Preventive maintenance activity | Corrective maintenance activity | Outputs | Output 1 |
|---|---|---|---|
| Inspect, clean, all | Exchange component | | "Internal failure fire sensor", coded, repeated |
| Inspect, clean, all | Exchange component | | "Fire", coded, repeated |
| Inspect, clean, all | Exchange component | | no signal |
| Inspect, clean, all | Exchange component | | deviating signal (none of the above coded signals) |

FIG 16A

Table 13: Fire Sensor C1: Failure Modes For FMEA Analysis

| | Fire Sensor S1, type: | intern | | | |
|---|---|---|---|---|---|
| 16 | Fire Sensor (generic) | intern | | | |
| 17 | Inputs | | Internal state | Failure mode | Failure rate |
| 19 | Input 1 (IR signal) | Input 2 (Power Supply) | Internal state | Failure mode | Failure rate |
| 21 | irrelevant | 5V +- 10% | Internal failure detected | various | 500 |
| 24 | IR present | 5V +- 10% | No internal failure detected | missed detection | 100 |
| 25 | IR not present | 5V +- 10% | No internal failure detected | false alarm | 500 |
| 26 | irrelevant | 5V +- 10% | No internal failure detected | no output signal | 50 |
| 27 | irrelevant | 5V +- 10% | No internal failure detected | deviation of output signal | 150 |

FIG 16B

| Preventive maintenance activity | Corrective maintenance activity | Outputs | |
|---|---|---|---|
| | | | Output 1 |
| Inspect, clean, all | Exchange component | | "Internal failure fire sensor", coded, repeated |
| Inspect, clean, all | Exchange component | | "No Fire", coded, repeated |
| Inspect, clean, all | Exchange component | | "Fire", coded, repeated |
| Inspect, clean, all | Exchange component | | no signal |
| Inspect, clean, all | Exchange component | | deviating signal (none of the above coded signals) |

FIG 17A

Table 14: CPU: Failure Modes For FMEA Analysis

| 14 | CPU (instantiation) type: | | | | | |
|---|---|---|---|---|---|---|
| 15 | CPU (generic) | Intern | | | | |
| 16 | Input 1 | Input 2 | Input 3 | Internal state | Failure mode | Failure rate |
| 19 | 5V +- 10% | irrelevant | irrelevant | Internal failure mode detected | various | 1000 |
| 23 | 5V +- 10% | Not ("No fire", coded, repeated) | irrelevant | No internal failure detected | Output 1 signal faulty | 50 |
| 24 | 5V +- 10% | irrelevant | Not ("No fire", coded, repeated) | No internal failure detected | Output 1 signal faulty | 50 |
| 25 | 5V +- 10% | "No fire", coded, repeated | "No fire", coded, repeated | No internal failure detected | Output 1 signal faulty | 50 |
| 26 | 5V +- 10% | Not ("No fire", coded, repeated) | irrelevant | No internal failure detected | Common cause failure | 25 |
| 27 | 5V +- 10% | irrelevant | Not ("No fire", coded, repeated) | No internal failure detected | Common cause failure | 25 |

FIG 17B

| Preventive maintenance actifity | Corrective maintenance activity | MDT [h] | Output 1 | unused<br>Output 2 | unused 2<br>Output 3 (status) |
|---|---|---|---|---|---|
| Inspect, clean, all | Exchange component | 1,5 | no signal (=LOW ="OPEN" OR "LEAVE OPEN") | irrelevant | irrelevant |
| Inspect, clean, all | Exchange component | 1,5 | HIGH signal (CLOSE) | irrelevant | irrelevant |
| Inspect, clean, all | Exchange component | 1,5 | HIGH signal (CLOSE) | irrelevant | irrelevant |
| Inspect, clean, all | Exchange component | 1,5 | no signal (=LOW ="OPEN" OR "LEAVE OPEN") | irrelevant | irrelevant |
| Inspect, clean, all | Exchange component | 1,5 | HIGH signal (CLOSE) | irrelevant | irrelevant |
| Inspect, clean, all | Exchange component | 1,5 | HIGH signal (CLOSE) | irrelevant | irrelevant |

FIG 18A

Table 15: Actuator: Failure Modes For FMEA Analysis

| | Actuator instantiation of type: | | | | |
|---|---|---|---|---|---|
| 22 | Actuator, simplified (generic) | Intern | | no programming capability | |
| 23 | Input 1 | Internal state | Failure mode | Failure rate | Preventive maintenance activity |
| 28 | <Digital signal, voltage range X>: LOW | Output closed | Sleeping fault: unable to close | 100 | Inspect and test |
| 29 | <Digital signal, voltage range X>: LOW | Output open | Sleeping fault: unable to close | 100 | Inspect and test |
| 30 | <Digital signal, voltage range X>: HIGH | Output closed | Sleeping fault: unable to close | 100 | Inspect and test |
| 31 | <Digital signal, voltage range X>: HIGH | Output open | Sleeping fault: unable to close | 100 | Inspect and test |
| 32 | <Digital signal, voltage range X>: LOW | Output closed | Sleeping fault: unable to open | 70 | Inspect and test |
| 33 | <Digital signal, voltage range X>: LOW | Output open | Sleeping fault: unable to open | 70 | Inspect and test |
| 34 | <Digital signal, voltage range X>: HIGH | Output closed | Sleeping fault: unable to open | 70 | Inspect and test |
| 35 | <Digital signal, voltage range X>: HIGH | Output open | Sleeping fault: unable to open | 70 | Inspect and test |
| 36 | <Digital signal, voltage range X>: HIGH | Output closed | opens uncommandedly | 200 | Inspect and test |
| 37 | <Digital signal, voltage range X>: LOW | Output open | closes uncommandedly | 150 | Inspect and test |

FIG 18B

| Inspection interval [h] | Corrective maintenance activity | MDT [h] with overhead | Output 1 | Fault detection |
|---|---|---|---|---|
| 300 | Replace defect element | 16 | Open | no |
| 300 | Replace defect element | 16 | Remains open | no |
| 300 | Replace defect element | 16 | Remains closed | no |
| 300 | Replace defect element | 16 | Remains open | yes |
| 300 | Replace defect element | 16 | Remains closed | yes |
| 300 | Replace defect element | 16 | Remains open | no |
| 300 | Replace defect element | 16 | Remains closed | no |
| 300 | Replace defect element | 20 | Open | yes |
| 300 | Replace defect element | 20 | Close | yes | ent kinds of safety analysis techniques can be used to assess a potential risk of an industrial system. For instance, failure modes and effects analysis FMEA can be used for failure analysis of an investigated system. FMEA involves analysis of components, assemblies and sub systems of an investigated system to identify failure modes as well as their causes and effects and to define activities such as mitigation measures etc. In a conventional failure mode and effect analysis for each component the failure modes and their resulting effects on the rest of the system can be recorded in a specific FMEA worksheet. FME(C)A is a design tool which can be used to systematically analyse postulated component failures and identify the resulting effects on the systems operations of the investigated system.

SYSTEM AND METHOD FOR CONTROLLING POWER GRID CONNECTION OF POWER CONSUMPTION ENTITY USING AN ANALYTICAL ARTIFACT

CROSS REFERENCE TO RELATED APPLICATIONS

This application claims priority to European application No. 17195964.6, having a filing date of Oct. 11, 2017, the entire contents of which are hereby incorporated by reference.

FIELD OF TECHNOLOGY

The following relates to a method for providing an analytical artifact used for development and/or analysis of an investigated technical system of interest.

BACKGROUND

A technical system can comprise a plurality of different components, in particular hardware components connected to each other via wired or wireless links. The system can comprise several sub systems which in turn can include different kind of hardware and/or software components to be executed by hardware components. A technical system has to fulfil different kinds of criteria. A technical system has to meet predetermined safety, reliability, availability or maintainability criteria to meet a technical standard or to fulfil obligations from a contract. The increasing complexity of technical systems makes it more difficult to develop, analyse, monitor and control them. A technical system can potentially be harmful to humans or other facilities. Different kinds of safety analysis techniques can be used to assess a potential risk of an industrial system. For instance, failure modes and effects analysis FMEA can be used for failure analysis of an investigated system. FMEA involves analysis of components, assemblies and sub systems of an investigated system to identify failure modes as well as their causes and effects and to define activities such as mitigation measures etc. In a conventional failure mode and effect analysis for each component the failure modes and their resulting effects on the rest of the system can be recorded in a specific FMEA worksheet. FME(C)A is a design tool which can be used to systematically analyse postulated component failures and identify the resulting effects on the systems operations of the investigated system.

Conventionally, the analysis artifacts such as an FMEA table used for FMEA analysis are generated manually by domain experts. Consequently, significant efforts, costs and time for experts are involved for developing and analysing complex technical systems.

SUMMARY

Accordingly, embodiments of the present invention provide a method for generating an analytical artifact used for developing and/or analysing a technical system in an automated process thus reducing the required time, the required costs and the required efforts of domain experts.

An embodiment of the invention provides according to the first aspect a method for providing an analytical artifact used for development and/or analysis of a technical system of interest comprised of components having associated machine readable functional descriptions including port definitions and component failure mode descriptions processed to generate automatically the analytical artifact in response to at least one applied system evaluation criterion as for instance an applied system failure criterion.

In a possible embodiment of the method according to the first aspect the generated analytical artifact comprises
a fault tree,
a Markov chain,
a combination of fault tree(s) and Markov chain(s)
an FMEA table,
an FMECA table, and or
an FMEDA table.

In a possible embodiment of the method according to the first aspect the fault tree and/or Markov chain are provided by transforming at least one system evaluation criterion into one or more corresponding relevant system states that may be represented by corresponding state patterns at ports forming a system boundary of the system of interest and by generating the fault tree and/or Markov chain on the basis of the relevant system states or system state patterns and on the basis of the component failure mode descriptions of the components of the system of interest.

In a further possible embodiment of the method according to the first aspect the system evaluation criterion comprises
a reliability criterion,
an availability criterion,
a maintainability criterion and/or
a safety criterion.

In a further possible embodiment of the method according to the first aspect the method comprises the steps of transforming the system evaluation criterion into at least one system state that can be represented by a state pattern, applying at least one state pattern to input ports and output ports of the system boundary of the system of interest, to derive in a further step relevant failure events by automatically taking into account the failure propagation mechanisms, and assembling the derived failure events to generate the fault tree and/or Markov chain used as an analytical artifact.

In a further possible embodiment the analytical artifacts are provided by transforming at least one system evaluation criterion into one or more corresponding relevant state patterns at ports at the system boundary and/or inside of the system of interest and by generating the analytical artifact on the basis of the relevant state patterns and on the basis of the component failure modes descriptions of the components of the system of interest.

In a still further possible embodiment of the method according to the first aspect the machine readable functional description of a component comprises
port definitions of input and output ports of the respective component,
component failure modes,
an internal state of the component,
a failure rate
a maintenance activity,
an inspection interval,
a mean down time, and/or
a mean time to repair.

In a possible embodiment of the method according to the first aspect reactions of the system of interest to single failure modes of the components of the system are determined to generate automatically an FMEA table, an FMECA table or an FMEDA table or parts of those.

In a possible embodiment reactions of the system of interest to single failure modes of the components of the system are determined to generate automatically an FMEA table, an FMECA table or FMEDA table or parts of those on the basis of an additional failure classification criterion.

In a further possible embodiment of the method according to the first aspect the system evaluation criterion is transformed by a linguistic transformation program into a corresponding relevant state pattern.

In a further possible embodiment of the method according to the first aspect the machine readable functional description of a component is defined in Systems Modeling Language (OMG SysML), Architecture Analysis and Design Language (AADL) or EAST-ADL.

In a still further possible embodiment of the method according to the first aspect the machine readable functional description of a component of the system of interest is stored in a local memory of the component integrated in said component, connected to a port of said component or attached to said component.

In a still further possible alternative embodiment of the method according to the first aspect the machine readable functional description of a component of the system of interest is stored in a remote data storage of a network.

In a possible embodiment of the method according to the first aspect the system evaluation criteria are derived from a technical safety standard or from a machine readable contract.

In a still further possible embodiment of the method according to the first aspect the generated analytical artifact is processed to monitor and/or control automatically components of the system of interest depending on an evaluation result of the processed analytical artifact.

In a still further possible embodiment of the method according to the first aspect the components of the system of interest comprise
hardware components,
software components to be executed by hardware components such as CPUs as well as embedded components.

An embodiment of the invention further provides according to a second aspect a system for analysing, monitoring and/or controlling a technical system of interest comprising the.

An embodiment of the invention provides according to the second aspect a system for analysing, monitoring and/or controlling a technical system of interest comprised of components having ports connected to each other via wired or wireless links and having associated machine readable functional descriptions stored in a local or remote memory and comprising port definitions and component failure mode descriptions processed by a processing unit to generate automatically at least one analytical artifact used to analyze, monitor and/or control the system of interest in response to at least one system evaluation criterion input to said processing unit.

BRIEF DESCRIPTION

Some of the embodiments will be described in detail, with reference to the following figures, wherein like designations denote like members, wherein:

FIG. 4 shows a first table for illustrating the operation of the method and system according to the present invention for a specific exemplary technical system to be investigated;

FIG. 5 shows a second table for illustrating the operation of the method and system according to the present invention for a specific exemplary technical system to be investigated;

FIG. 6 shows a third table for illustrating the operation of the method and system according to the present invention for a specific exemplary technical system to be investigated;

FIG. 6A shows a fourth table for illustrating the operation of the method and system according to the present invention for a specific exemplary technical system to be investigated;

FIG. 6B shows a fifth table for illustrating the operation of the method and system according to the present invention for a specific exemplary technical system to be investigated;

FIG. 6C shows a sixth table for illustrating the operation of the method and system according to the present invention for a specific exemplary technical system to be investigated;

FIG. 7 shows a seventh table for illustrating the operation of the method and system according to the present invention for a specific exemplary technical system to be investigated;

FIG. 7A shows an eighth table for illustrating the operation of the method and system according to the present invention for a specific exemplary technical system to be investigated;

FIG. 7B shows a ninth table for illustrating the operation of the method and system according to the present invention for a specific exemplary technical system to be investigated;

FIG. 7C shows a tenth table for illustrating the operation of the method and system according to the present invention for a specific exemplary technical system to be investigated;

FIG. 7D shows an eleventh table for illustrating the operation of the method and system according to the present invention for a specific exemplary technical system to be investigated;

FIG. 7E shows a twelfth table for illustrating the operation of the method and system according to the present invention for a specific exemplary technical system to be investigated;

FIG. 7F shows a thirteenth table for illustrating the operation of the method and system according to the present invention for a specific exemplary technical system to be investigated;

FIG. 8 shows a fourteenth table for illustrating the operation of the method and system according to the present invention for a specific exemplary technical system to be investigated;

FIG. 8A shows a fifteenth table for illustrating the operation of the method and system according to the present invention for a specific exemplary technical system to be investigated;

FIG. 8B shows a sixteenth table for illustrating the operation of the method and system according to the present invention for a specific exemplary technical system to be investigated;

FIG. 9 shows a seventeenth table for illustrating the operation of the method and system according to the present invention for a specific exemplary technical system to be investigated;

FIG. 9A shows a eighteenth table for illustrating the operation of the method and system according to the present invention for a specific exemplary technical system to be investigated;

FIG. 9B shows a nineteenth table for illustrating the operation of the method and system according to the present invention for a specific exemplary technical system to be investigated;

FIG. 10 shows a twentieth table for illustrating the operation of the method and system according to the present invention for a specific exemplary technical system to be investigated;

FIG. 10A shows an twenty-first table for illustrating the operation of the method and system according to the present invention for a specific exemplary technical system to be investigated;

FIG. 10B shows a twenty-second table for illustrating the operation of the method and system according to the present invention for a specific exemplary technical system to be investigated;

FIG. 11 shows a twenty-third table for illustrating the operation of the method and system according to the present invention for a specific exemplary technical system to be investigated;

FIG. 11A shows a twenty-fourth table for illustrating the operation of the method and system according to the present invention for a specific exemplary technical system to be investigated;

FIG. 11B shows a twenty-fifth table for illustrating the operation of the method and system according to the present invention for a specific exemplary technical system to be investigated;

FIG. 12 shows a twenty-sixth table for illustrating the operation of the method and system according to the present invention for a specific exemplary technical system to be investigated;

FIG. 12A shows a twenty-seventh table for illustrating the operation of the method and system according to the present invention for a specific exemplary technical system to be investigated;

FIG. 12B shows a twenty-eighth table for illustrating the operation of the method and system according to the present invention for a specific exemplary technical system to be investigated;

FIG. 13 shows a twenty-ninth table for illustrating the operation of the method and system according to the present invention for a specific exemplary technical system to be investigated;

FIG. 13A shows a thirtieth table for illustrating the operation of the method and system according to the present invention for a specific exemplary technical system to be investigated;

FIG. 13B shows a thirty-first table for illustrating the operation of the method and system according to the present invention for a specific exemplary technical system to be investigated;

FIG. 14 shows a thirty-second table for illustrating the operation of the method and system according to the present invention for a specific exemplary technical system to be investigated;

FIG. 14A shows a thirty-third table for illustrating the operation of the method and system according to the present invention for a specific exemplary technical system to be investigated;

FIG. 14B shows a thirty-fourth table for illustrating the operation of the method and system according to the present invention for a specific exemplary technical system to be investigated;

FIG. 14C shows a thirty-fifth table for illustrating the operation of the method and system according to the present invention for a specific exemplary technical system to be investigated;

FIG. 15 shows a thirty-sixth table for illustrating the operation of the method and system according to the present invention for a specific exemplary technical system to be investigated.

FIG. 15A shows a thirty-seventh table for illustrating the operation of the method and system according to the present invention for a specific exemplary technical system to be investigated;

FIG. 15B shows a thirty-eighth table for illustrating the operation of the method and system according to the present invention for a specific exemplary technical system to be investigated;

FIG. 16 shows a thirty-ninth table for illustrating the operation of the method and system according to the present invention for a specific exemplary technical system to be investigated;

FIG. 16A shows a fortieth table for illustrating the operation of the method and system according to the present invention for a specific exemplary technical system to be investigated;

FIG. 16B shows a forty-first table for illustrating the operation of the method and system according to the present invention for a specific exemplary technical system to be investigated;

FIG. 17 shows a forty-second table for illustrating the operation of the method and system according to the present invention for a specific exemplary technical system to be investigated;

FIG. 17A shows a forty-third table for illustrating the operation of the method and system according to the present invention for a specific exemplary technical system to be investigated;

FIG. 17B shows a forty-fourth table for illustrating the operation of the method and system according to the present invention for a specific exemplary technical system to be investigated;

FIG. 18 shows a forty-fifth table for illustrating the operation of the method and system according to the present invention for a specific exemplary technical system to be investigated;

FIG. 18A shows a forty-sixth table for illustrating the operation of the method and system according to the present invention for a specific exemplary technical system to be investigated; and FIG. 18B shows a forty-seventh table for illustrating the operation of the method and system according to the present invention for a specific exemplary technical system to be investigated.

DETAILED DESCRIPTION

Figure 1:
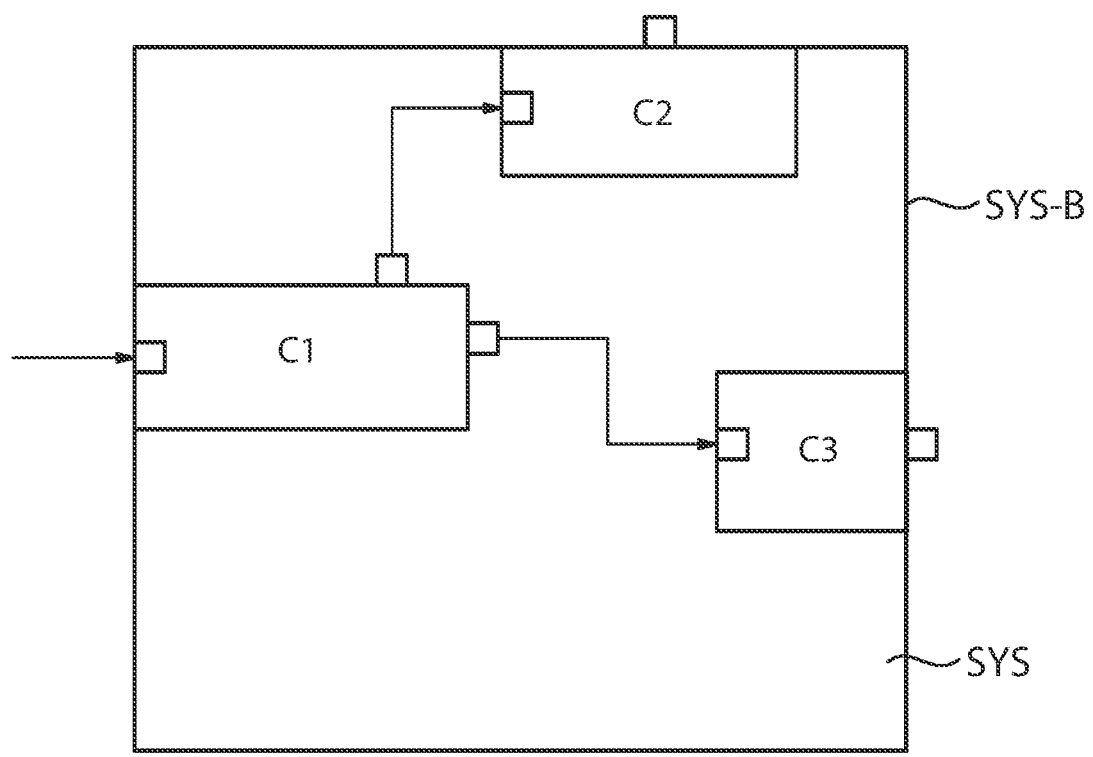
FIG. 1 shows an exemplary technical system of interest which can be defined and investigated by the method and system in accordance with embodiments of the present invention.

As can be seen in the diagram illustrated in FIG. 1 an investigated technical system SYS can comprise several components C. The components C can comprise sub components such as switches, sensors or actuators, software components to be executed by hardware components such as CPUs and embedded components comprising both hardware and embedded software to run the respective hardware component. Each component C can comprise input ports and output ports for connecting the respective component with other components of the defined and investigated system. In the illustrated exemplary system of FIG. 1 the system comprises three components C1, C2, C3. The system SYS comprises a system boundary SYS-B which comprises the interface ports of the system to other systems. In the illustrated example of FIG. 1 the first component C1 comprises an input port to receive a signal and two output ports which are connected to other components C2, C3 of the investigated system SYS. The second component C2 comprises a single input port connected to the first output port of the first component C1. The second component C2 comprises a single output port which forms an external port or interface at the system boundary SYS-B of the system. The third component C3 also comprises a single input port and a single output port. The single input port of the component C3 is connected internally to the second output port of the first component C1 as shown in FIG. 1. The output port of the third component C3 forms an external port or interface at the system boundary SYS-B of the investigated system SYS. As can be seen in FIG. 1 the system boundary SYS-B comprises in the illustrated embodiment three ports, i.e. the input port of the first component C1, the output port of the second component C2 and the output port of the third component C3. The components C within the system SYS can comprise different kinds of components C including hardware components, software components to be executed by hardware components such as CPUs and embedded components. The hardware components can comprise all analogue or digital components. The components C, C2, C3 each have an associated machine readable functional description including the port definitions as well as component failure mode descriptions which are processed to generate automatically an analytical artifact used for development and/or analysis of the investigated technical system of interest SYS in response to at least one applied system evaluation criterion. These analytical artifacts comprise in a possible embodiment a fault tree, a Markov chain, a combination of fault tree(s) and Markov chain(s), an FMEA table, or an FMECA table, an FMEDA table. These artifacts are generated automatically on the basis of a full functional description of the system of interest SYS including a machine readable description of the failure modes of its components or sub systems. Further, the analytical artifacts can be generated for different kinds of evaluation criteria such as for instance safety, reliability, maintainability and/or availability criteria.

The different components C such as components C1, C2, C3 of the system SYS illustrated in FIG. 1 can be supplied by different suppliers which offer their technical components or sub systems with a standardized generic functional description which is machine readable. It is also possible to use a semiformal functional description with OMG SysML or AADL or EAST-ADL. The functional description does include input and output port definitions and additional information data about failure modes, their causes and corresponding failure properties, in particular failure rates, preventive and corrective maintenance activities and test-related data. In a possible embodiment each component C comprises an associated functional description. This functional description of the component C can comprise the port definitions of the input and output ports of the respective component C, all component failure modes of the component, at least one internal state of the respective component, a failure rate, maintenance activities, an inspection interval and/or a mean down time and/or a mean repair time of the component.

The different vendors or suppliers providing components C for the complex technical system SYS can in future use a standardized common generic functional description of the respective component C which can be stored in a memory. In a possible embodiment the machine readable functional description of the respective component C within the system SYS of interest can be stored in a local memory of the component C. The local memory can be integrated within the component. In a possible embodiment the functional description can be read from the memory by a reader. In a still further possible embodiment the functional description for a component can be output via ports of the system SYS in response to a specific request applied to the respective component or even applied to the system SYS. In a specific implementation the system boundary SYS-B may comprise a specific pin or port used to read out a functional description from different components C of the investigated system SYS. In an alternative implementation the functional description can also be read out from a local memory output by the component using internal connections and an output port of a component of the system SYS such as the output port of the second or third components C2, C3 illustrated in the example of FIG. 1. For instance, the functional description of components C1, C2 can be read from the output port of component C2 and the functional description of components C1, C3 can be read from the output port of component C3.

The functional descriptions extracted from the system SYS of interest can be supplied to a processor or processing unit of an investigating system which can be used for analysing, monitoring and/or even controlling the technical system SYS of interest or a larger system that may comprise the technical system SYS using at least one automatically generated analytical artifact. This analytical artifact can be generated from the associated machine readable functional descriptions of the different components C within the investigated system SYS. In an alternative embodiment machine readable functional description of a component C within the system SYS of interest can also be stored in a cloud, in a remote data storage or database. Each component C of the investigated system SYS comprises an associated machine readable functional description. The different machine readable functional descriptions of all components C forming part of the investigated system SYS can be evaluated or processed by a processing unit to generate automatically at least one analytical artifact for at least one applied system evaluation criterion. This analytical artifact can be used for developing and/or analysing and/or controlling the investigated technical system SYS or a larger system that may comprise the system SYS. In the illustrated example of FIG. 1 the overall system description also includes the connection from the first output port of the first component C1 to the input port of component C2 as well as the connection from the second output port of component C1 to the input port of component C3. It is also possible to embed the overall functional description into the corresponding system environment and take into account the relevant operational conditions of the system. In a preferred embodiment a composition of components or sub systems to the overall investigated system SYS can be conducted automatically. The generic functional description of the component or sub system can reflect standardized implementation concepts or architectural patterns, e.g. with respect to sensor circuit, signalling or communication protocols which facilitates the system development. The relevant component functionality of the system component can be selected and enriched using architectural patterns if needed in the course of the system definition and system development. It is possible that application classes for programmable or configurable components are predefined for selection from a repository.

In a possible embodiment system-specific information data can be added. This may for instance relate to a fact that an uncontained fire leads to a very long mean down time MDT of the investigated system since the whole system has to be rebuilt. Critical combinations of the events can also be specified with corresponding mean down times MDT in order to assist a complex safety, reliability or availability analysis. A more comprehensive description of the component or sub system however may already include these kinds of dependencies in the functional description of the respective components.

The automatically generated analytical artifact can be used for a safety analysis, a reliability analysis, an availability analysis, a maintainability analysis or further evaluations of the system. Accordingly, the investigated system can be investigated to check whether the system fulfils certain system evaluation criteria. These system evaluation criteria can comprise reliability criteria, availability criteria, maintainability criteria, safety criteria or further evaluation criteria. In a possible embodiment the system evaluation criterion can be derived automatically from a technical safety standard or contractual obligations stored in a database. Further, the system evaluation criteria can be derived in a possible embodiment automatically from a machine readable contract. For example, a safety criterion may be based on a national or international standard and a reliability criterion, a maintainability criterion or an availability criterion can be based on specific contractual obligations that can be transformed and translated into at least one state pattern. The corresponding state patterns have to be applied to relevant input ports and/or output ports of the investigated system. With these assignments it is possible to derive relevant failure events by following the method described below. The derived relevant failure events are then assembled to the required safety, reliability or availability analytical artifact, as for instance a fault tree model. The imminent failure propagation has to be respected in order to identify the relevant failure events and to assemble the corresponding fault tree. The procedure can be conducted automatically by resorting to the overall functional system or solution description or to a subset of it depending on the evaluation criterion. The generated analytical artifact can comprise in a possible embodiment a fault tree or a Markov chain. A fault tree is generated automatically on the basis of the machine readable functional descriptions of all components C forming part of the investigated system SYS. These functional descriptions include port definitions and component failure modes of the different components. A failure mode relates to a specific manner or way of which a failure occurs. A failure mode can describe a failure state of the respective item (or function) under consideration. A failure mode is the result of a failure mechanism. The components' or sub systems' failure mode can contribute directly or according to a more sophisticated logic of failure events on system level. This may involve logic combinations with other components C or sub systems of the investigated system SYS according to a specifically implemented evaluation logic.

In a possible embodiment the functional description of each component C includes data about failure modes as well as about preventive and/or corrective maintenance activities and even test-related data on component or sub system level. This information can be aggregated in order to establish maintenance artifacts such as required resources, required tooling, training requirements or corresponding plans. Preventive and/or corrective maintenance activities can specify tools, skills, training requirements or repair time etc. In order to determine a relevant down time it is required to respect specific circumstances of the operational concept such as additional logistical overhead etc. Data with respect to the failure modes can also indicate if and how those failure modes can be detected. This data can be used for generation of test cases.

With respect to a safety analysis of the investigated system SYS relevant safety functions can explicitly be defined with their functional dependencies in course of the system development.

The standardized nature of most safety criteria can be exploited to prepare an ontology to be used for the system design in order to match the corresponding terms or at least in order to facilitate associated mapping processes between the functional description of the system and the corresponding state pattern. In case that the safety, reliability, availability or maintainability artifacts do not meet predetermined quantitative target values it may be required to further detail the functional description or even to modify the system architecture or the operational concept and to repeat the analysis thereafter until the required target values are reached.

Figure 2:
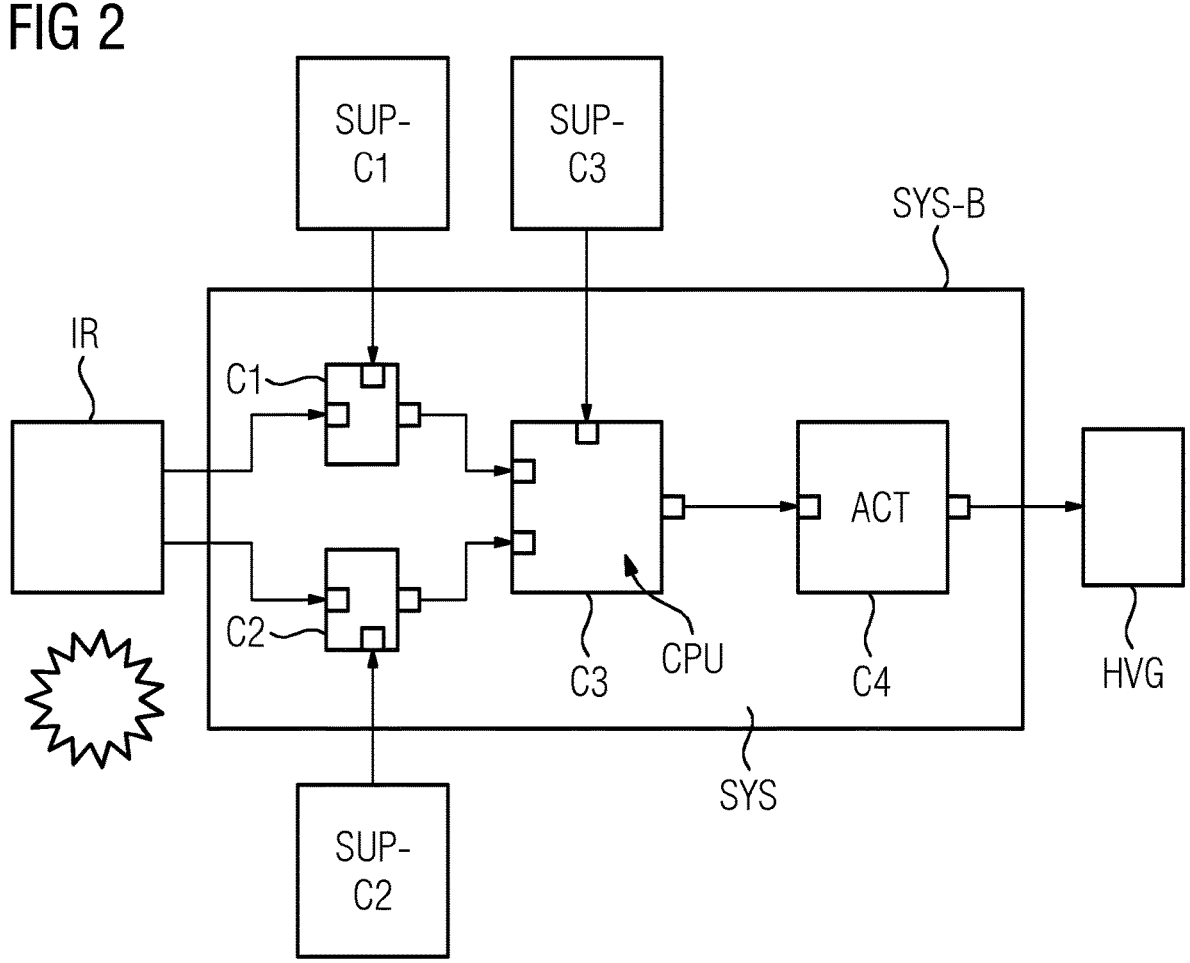
FIG. 2 shows a further exemplary technical system which can be defined and investigated by a method and system in accordance with embodiments of the present invention.

FIG. 2 shows a diagram for illustrating a possible exemplary embodiment of a system SYS of interest to be investigated. The illustrated system of FIG. 2 comprises a system to detect fire and to disconnect a target system from a high voltage power supply grid. The target system can comprise one or several power consumption entities and can be disconnected from the high voltage power supply grid by an actuator component C4 of the investigated technical system SYS. The investigated system SYS comprises in the illustrated embodiment four different components C1, C2, C3, C4. The investigated system consists of two infrared sensors C1, C2, a CPU component C3 and an actuator component C4. The actuator component C4 is capable of opening and closing a connection to an external high voltage power supply grid HVG. This is a measure established in order to contain or to support the extinction of fire.

A potential source of infrared radiation IR which may be caused by fire shows statistical behaviour. In the illustrated example the input ports of the infrared sensor components C1, C2 are facing the potential IR source (fire). In the illustrated figure of FIG. 2 the arrows indicate if the respective port forms an input port or an output port.

Both sensor components C1, C2 are dedicated to sense the infrared radiation source and to transmit a message "fire" or "no fire" to the connected CPU controller C3. Each sensor C1, C2 can have implemented the functionality to detect internal sensor failures and to transmit the signal "internal failure fire sensor" in these cases. For instance, both components C1, C2 receive a supply voltage from external power supply sources SUP-C1, SUP-C2 as illustrated in FIG. 2. Further, the CPU component C3 also receives an external power supply source SUP-C3 outside the system boundary SYS-B of the investigated system SYS.

A logic can be implemented in the CPU component C3 as follows. A "HIGH" output level toward the actuator component C4 is only activated in case that both fire detector components C1, C2 transmit a "no fire" signal to the CPU component C3. In other cases the output level at the output port of the CPU component C3 is set to "LOW". Both sensor components C1, C2 as well as the CPU component C3 require dedicated power supplies to function as intended. Lacking power supply leads to "no signal" at the output port of the fire detector components C1, C2 or to a "LOW" signal at the CPU output port of component C3 respectively.

The detection system SYS as illustrated in FIG. 2 has to meet different kinds of predefined evaluation criteria. For example, a possible safety criterion might be that the high voltage grid HVG has to be switched off by the actuator C4 if fire is detected. The system failure criterion can be transformed in a possible embodiment into one or more corresponding relevant state patterns at the ports forming the system boundary SYS-B of the investigated system SYS. The states at the different ports of the system boundary SYS-B comprise failure criterion fulfilling states and failure criterion not fulfilling states. In a possible embodiment the state pattern can be binary, i.e. high/low.

The potential IR source representing the fire can be represented by a state "1" (high) applied to the input ports of the sensor components C1, C2. If the investigated system SYS operates correctly, the output port of the actuator component C4 has a state "0" (low). Accordingly, a binary state pattern at these three ports "1-1-0" indicates a correct operation of the system with respect to the system function described above. The safety criterion in this case is not fulfilled in the former case. A state pattern such as "1-1-1" indicating that the investigating system does not switch off the high voltage grid HVG although both sensor components C1, C2 face an IR source indicates that the safety failure criterion is fulfilled and that the safety function "switch off the high voltage grid HVG by the actuator C4 if fire is detected" of the system SYS has failed. The states of all other ports of system SYS are arbitrary with respect to the evaluation criterion chosen above i.e. all states of these ports have to be considered. For reasons of simplicity these ports are not depicted here in the corresponding pattern representation. In order to express that all states of a certain port matter one can for instance choose a representation "X" for the corresponding port in order to express that e.g. in case of binary patterns both states "1" and "0" apply.

Different kind of state patterns can be generated for different system evaluation criteria including safety criteria, reliability criteria, availability criteria and maintainability criteria. In a possible embodiment at least one system evaluation criterion is automatically transformed into one or more corresponding relevant state patterns at the ports forming the system boundary SYS-B and/or at internal system ports of the investigated system SYS. In a further step a fault tree and/or Markov chain can be generated on the basis of the relevant state patterns and on the basis of the component failure modes of the components C forming part of the investigated system SYS. In the illustrated example of FIG. 2 a fault tree can be generated on the basis of relevant state patterns derived from at least one system failure criterion and on the basis of the component failure modes of the components C1, C2, C3, C4 specified in the associated machine readable functional descriptions of the respective components C1 to C4.

Figure 3:
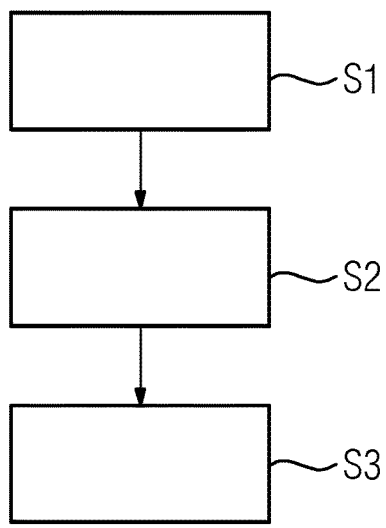
FIG. 3 shows a flowchart of an exemplary embodiment of a method according to a first aspect of the present invention.

As illustrated in the flowchart of FIG. 3 the automatic generation of an analytical artifact such as a fault tree FT can be performed in different main steps.

In a first step S1 the respective system evaluation criterion is transformed into at least one state definition which may for instance be presented in the form of a binary state pattern. The corresponding evaluation or failure criterion for system SYS can demand that the system is or remains connected to the high voltage power supply grid in case of a fire. In a specific embodiment the system evaluation criterion can be a text based system evaluation criterion which is transformed automatically by a linguistic transformation program into a corresponding relevant state pattern such as a binary or multi-level state pattern.

In a further step S2 the generated state pattern and hence the evaluation criterion is applied to input ports and output ports at the system boundary SYS-B of the system SYS or to internal ports of the system of interest. This may comprise that both fire detector components C1 and C2 are exposed to infrared radiation (IR) due to fire and that the actuator component C4 is or remains in the state "closed" or "connected to the high voltage power supply grid (HVG)".

In a further step S3 all combinations of events that satisfy the input and output ports state pattern and hence the evaluation criterion are derived by automatically taking into account the failure propagation mechanisms and assembled to generate the fault tree which forms an analytical artifact that can be used for development and/or analysis of the investigated technical system. The combination of events that satisfy the evaluation criterion is based on the component failure modes and the functional dependencies of the system SYS.

The following tables illustrate examples for functional descriptions of the components C of the investigated system as illustrated in FIG. 2. To demonstrate the process of both the generic version as it may be delivered by a component supplier or vendor as well as the instantiated version including required modifications, i.e. the implemented version of the component within the system SYS are depicted in the tables if "instantiation" is indicated. It is the lower of the presented tables with the exception of the actuator table where for reasons of required space the tables are split on two separate pages.

The failure rates and mean down times MDTs within the tables are fictitious and are only used for demonstration purposes. Further, every function and for every failure mode corresponding preventive and/or corrective maintenance activities are indicated. By knowing the relevant operational concept it is assumed that the corresponding mean down times MTDs can be calculated from the data of the functional descriptions including port definitions and component failure mode descriptions, e.g. by adding an appropriate overhead for travel, access or setup. The mean down times MDT for the instantiated components C are a function of the generic values and can be implemented in the operational concept.

Table 1 illustrated in FIG. 4 shows a functional description of the power supply component for the fire sensors C1, C2. Table 1 shows the functional description of the generic components and the functional description of the instantiated and modified power supply component. The functional description of the instantiated and modified component emerges from adapting the generic functional description with respect to the specific requirements of the system in interest.

Table 2 illustrated in FIG. 5 shows the functional description for the power supply for the CPU component C3 in the generic and instantiated and modified form.

Table 3 illustrated in FIG. 6A, 6B, 6C shows a functional description for the fire sensor components C1, C2 of the investigated system both in generic and instantiated form.

Table 4 illustrated in FIG. 7A to 7F shows a functional description of the CPU component C3 in generic and instantiated and modified form. The instantiated and modified functional description accounts for the specific requirements of the system to be built. This entails the relevant logic to be implemented on the CPU.

Further, table 5 in FIG. 8A, 8B illustrates the functional description of the actuator component C4 in generic form.

Further, table 6 of FIG. 9A, 9B illustrates the functional description of the actuator component C4 in instantiated form.

Failure modes connected to the rows with the indication "no" with respect to "fault detection" can be omitted or filtered since for the corresponding operation request the dormant or sleeping fault is irrelevant.

In a further possible embodiment one may choose to omit the corresponding lines from the functional description.

For demonstrating the operation of a method according to the present embodiment of the invention two different exemplary evaluation criteria may be applied to the investigated system SYS as illustrated in FIG. 2.

For example, the following system safety criterion 1 can be applied: "In case of fire the system shall be disconnected from the high voltage power supply grid with a tolerable hazard rate of THR_Fire_1."

The definition above implies a present fire. This fire entails an infrared radiation at the system boundary SYS-B of the investigated system SYS at the input ports of the fire sensor components C1, C2 shown in FIG. 2. Therefore it is possible to exclude the corresponding states at the input ports of the fire sensor components that refer to "IR not present".

The system output side is represented by the output port of the actuator component C4. Only in case of a closed connection between the output port of the actuator component C4 towards the high voltage power supply grid HVG a violation of the specified safety criterion is possible. In a possible implementation by means of a filter function one gets the potential failure states or events as indicated in following table 7 by excluding all states referring to an open output connection and by excluding sleeping failure modes that are irrelevant to the corresponding switching request and hence cannot be detected in course of this operation.

Table 7 shown in FIG. 10A, 10B illustrates the relevant states for an exemplary system failure criterion.

One can identify two failure modes of the actuator from table 7 that contribute to the event according to a potential violation of the exemplary safety criterion which can be referred to as a safety function failure. With respect to failure propagation it is additionally possible that functions that constitute output to the actuator's input also contribute to system failures according to the safety criterion 1. However as can be seen from table 7 above this is only possible in case a "HIGH" level is applied to the input port of actuator component C4. The input port of the actuator component C4 is elected and corresponds to the output port of the CPU component C3 as illustrated in FIG. 2. Consequently the CPU's table can be filtered accordingly.

Table 8 shown in FIG. 11A, 11B illustrates the relevant states for the CPU component C3 for a potential violation of the above exemplary system safety criterion 1.

On the basis of the functional description of table 8 it is possible to identify four additional failure modes of the CPU component C3 that can contribute to the safety failure criterion. Moreover, functions delivering input to the CPU component C3 can also contribute to failures on a system level by means of failure propagation. This however is only possible as long as the input ports of the CPU component C3 are connected to the fire sensing components C1, C2 both receive the signal "no fire" and the CPU power supply works.

By taking into account the fact that a fire and hence infrared radiation must be present in order to be relevant for the above given exemplary safety criterion 1 gets table 9 for the fire sensor component C1.

Table 9 shown in FIG. 12A, 12B illustrates relevant states of the fire sensor component C1 for the above given exemplary system safety criterion 1. The same applies to fire sensor component C2.

From the above analysis it can be derived that only one failure mode as depicted in table 9 contributes to the safety criterion on sensor level. This failure mode is only relevant in case both sensor components erroneously transmit the "no fire" signal to the CPU component C3 due to "missed detection". The evaluation logic ensures that only if both sensor components transmit the "no fire" signal to the CPU component C3 a contribution to the analytical artifact according to a potential violation of safety criterion 1 is possible.

The analytical artifact representing a fault tree for a safety function can now be written as below. The OR[ . . . , . . . ]-operator represents an OR gate of the elements listed in between its brackets. This OR[ . . . , . . . ]-operator can also be applied to just one element. The corresponding table and its lines for the relevant failure mode are indicated in parenthesis.

Fault Tree
(System "Fire Detection And Disconnection From The Grid", Application of "Safety Criterion 1")
 TOPEVENT(Safety Criterion 1)=
 (Fire sensor S1: OR [24] AND Fire sensor S2: OR [24]) OR
 CPU: OR [24, 25, 27, 28] OR
 Actuator: OR [32, 37]

The numbers in the brackets illustrate rows within the above tables corresponding to failure modes of the respective components.

A fault tree is generated automatically for the TOPEVENT corresponding to a potential violation of the system safety criterion 1.

A quantitative fault tree evaluation that may be executed by means of commercial fault tree calculation software will yield a result that has to be compared with the safety criterion 1 in order to finally determine whether the safety criterion has been achieved or failed. The same applies to the fault trees below.

The compilation represents a conservative approximation. This means that the effects of failure modes are entirely propagated to the system output even though other failure events on this way could diminish their influence. The method disclosed in this patent application can be used to calculate the results precisely by taking into account those failure modes that prevent the investigated system to show a malfunction according to the definition of a certain criterion. It is possible to calculate the effects of combined failure modes where one failure mode prohibits another failure mode to propagate. Consequently, a more general description is the following generated fault tree:

Fault Tree
(System "Fire Detection And Disconnection From The Grid",
Application Of "Safety Criterion 1", detailed)
 TOPEVENT(Safety Criterion 1)=
 (Fire sensor S1: OR [24]) AND (Fire sensor S2: OR [24])
 ANDNOT(CPU: OR [19,20,26]) OR
 (CPU: OR [24,25,27,28] ANDNOT (Actuator:OR[31,36])) OR
 Actuator: OR [32,37]

Please note that the events "Fire sensor S1:OR[20]", "Fire sensor S2:OR[20]" as well as "CPU:OR[18]" correspond to events that are outside of the relevant system boundary SYS-B. In many cases these external events can be considered as being ideal, i.e. without any failure mode. Nevertheless, the method according to the present embodiment of the invention allows to respect the influence in case that corresponding probabilistic data is given or can be estimated.

By means of the method according to the present embodiment of the invention the relevant failure modes can be selected and composed according to a relevant state pattern. With respect to computing the corresponding results one has to take into account the nature of the failure modes, i.e. dormant or sleeping failures have to be calculated by taking into account their test or operational interval and hence their so-called time at risk (TAR).

For illustrating the operation of the method according to the present embodiment of the invention a second exemplary evaluation criterion with respect to reliability may be applied to the system.

The corresponding reliability criterion 2 is given as follows:

"The mean number of unintended disconnections from the high voltage power supply grid per year caused by the system shall not exceed NUD(number of unintended disconnections)_PerCalendarYear_1"

Note that this definition of the criterion only focuses on disconnections that are caused without a fire being present since a disconnection due to fire is intended. Moreover being unable to reconnect to the high voltage power supply grid HVG (e.g. due to a dormant fault) is excluded by definition of the reliability criterion.

Table 10 of FIG. 13A, 13B shows the relevant states of the actuator component C4 of the system SYS for a potential violation of the reliability criterion stated above.

Hence the actuator component C4 contributes to the relevant events only with its failure mode "opens uncommandedly". All other failure modes can be excluded with respect to this reliability criterion.

Moreover it can be derived from the list of dataset above that only a "LOW" signal level that is equivalent to "no signal" at the input port of the actuator C4 needs to be regarded with respect to a potential failure propagation. Since the input port of the actuator C4 corresponds to the output port of the CPU component C3 the CPU list can be filtered accordingly.

Table 11 shown in FIG. 14A, 14B, 14C below illustrates the relevant states of the CPU component C3 for the reliability criterion stated above.

Failure modes of the CPU component C3 that have to be reflected in this reliability artifact are the ones in lines 20 and 26. Lines 19, 22 and 23 in table 11 represent potentially propagated failure modes of functions connected to the input port of the CPU component.

According to FIG. 2 the power supply of the CPU component C3 is located outside the relevant system boundary SYS-B. Consequently faults caused by the CPU power supply component (or function) SUP-C3 do not relate to the reliability criterion 2 and shall not be attributed to the investigated system SYS as indicated in line 19 of table 11 and hence can be left out for generating the corresponding analytical artifact.

Contrary to this the events indicated in lines 22, 23 of table 11 represent output states of the fire sensor components C1, C2. Those are located inside the relevant system boundary and hence belong to the investigated system SYS as illustrated in FIG. 2.

It can be derived that the relevant input signal on the input ports respectively must be NOT "no fire" which means that all other signal apart from the "no fire" signal must be regarded. The power supplies SUP-C2, SUP-C2 for the sensor components C1, C2 are both located outside the relevant system boundary SYS-B. Hence their contributions can be ignored with respect to the reliability artifact. The remaining failure events caused by sensor component C1 are depicted in Table 12.

Table 12 shown in FIG. 15A, 15B illustrates the relevant states of fire sensor component C1 for a potential violation of the above stated reliability criterion 2.

A situation with an infrared signal IR being present at input port of sensor component C1 must be excluded since this corresponds to a normal intended sensor operation and does not constitute an unintended disconnection from the high voltage power supply grid HVG. The same holds for fire sensor component C2.

Please note that all remaining failure modes of the list of both sensor components do contribute to the analytical artifact since the implemented CPU logic outputs a "LOW" level at its output port in case that any of the transmitted fire sensor signals deviates from the "no fire" signal.

The analytical artifact formed by a fault tree can now be written as below. The corresponding table and its lines for the relevant failure modes are indicated in parenthesis.

Fault Tree
(System "Fire Detection And Disconnection From The Grid", Application Of "Reliability Criterion 2")
   TOPEVENT(Reliability Criterion 2)=
   Fire sensor S1:OR [21,25,26,27]OR Fire sensor
   S2:OR [21,25,26,27]OR
     CPU:OR [20,26]OR
     Actuator:OR [36]

A quantitative fault tree evaluation by means of e.g. a commercial fault tree calculation software will enable to determine if the reliability criterion 2 has been met or failed.

The method according to the present embodiment of the invention can also be used to support the generation of FMEA artifacts or its derivatives such as Failure Modes and Effects and Critically Analysis (FMECA) or a Failure Modes, Effects and Diagnostic Analysis (FMEDA).

On the basis of generated or manually elaborated FMEA artifacts it is also possible to generate, elaborate or detail relevant functional descriptions. For FMEA analysis and corresponding derivatives single faults or failures can be investigated while the remaining system is supposed to function perfectly.

The aspect of "occurrence" can be addressed by means of a failure rate or the probability of a certain failure mode. Specific environmental conditions may be involved such as for instance temperature, load, switching rate etc.

The aspect of "detectability" can be addressed by corresponding control functionality of the system, by operations disclosing certain failure states, by self testing or by means of preventive maintenance measures including for instance inspections or testing procedures in order to discover dormant faults within the system.

Further, the aspect of "severity" can be addressed by means of functional dependencies. However its significance can be defined application-specific. A certain classification can be prepared in advance and then applied to the different output results.

It is possible that a supplier of a component may add a description of the failure causes for the failure modes of the components or sub systems delivered to the system manufacturer. This allows a more focused procedure during system development, e.g. by means of adding dedicated sensor circuits or enforcing quality measures to detect failures earlier and more reliably.

For the elaborated example a severity classification is used. It may be assumed that an unwanted disconnection from the high voltage power supply grid HVG be rated with a number of e.g. "5" while a fire event that does not lead to a disconnection from the high voltage power grid is rated with a number "9" due to its potential devastating nature and its long reinstatement time. Moreover, it can be supposed that a detected fire can be fought quickly and hence be kept well contained. All other failures may be rated with a value "2".

The FMEA severity classification described above corresponds to certain system states or state patterns. Those state patterns can be used to classify the severity on system failures in an automated way.

The failure modes of fire sensor component C1 are displayed in table 13 shown in FIG. 16A, 16B. Table 13 illustrates the failure modes of fire sensor component C1 for FMEA Analysis.

The logic implemented in the CPU component C3 can evaluate the fire sensor component output signals and can initiate a disconnection from the high voltage power supply grid HVG if the signal of fire sensor component C1 deviates from "no fire". Hence all events illustrated in table 13 with the exception of line 24 can be rated with a number "5" directly because they lead to a disconnection from the power supply grid HVG. In case of line 24 of table 13 an infrared source (such as a fire) must be present. With the assumption of only a single failure being present in the entire system SYS it can be concluded that fire sensor component C2 works, detects the infrared source and transmits the fire signal to the CPU component C3. The CPU component C3 in turn can command a disconnection from the high voltage power grid HVG which results in a value "5" rating again. Consequently, all single faults of the fire sensor component C1 lead to a number "5" rating. The same applies to fire sensor component C2.

Failure modes of the CPU component C3 of the system SYS are displayed in table 14. Table 14 shown in FIG. 17A, 17B illustrates the failure modes of the CPU component C3 for FMEA analysis.

The failure modes indicated in lines 19 and 25 of table 14 lead to a number "5" rating. The events indicated in all other lines of the table lead to a number "9" rating since an infrared source must be present. This is the case because the fire sensors must transmit the "fire" signal due to the single failure assumption as indicated before and hence also a fire must be present.

Failure modes of the actuator component C4 are indicated in table 15. Table 15 shown in FIG. 18A, 18B illustrates the failure modes of the actuator component C4 of the system for FMEA analysis.

The dormant or sleeping faults according to the lines 28, 29, 30, 33, 34, 35 of table 15 cannot be detected. Here a normal operation is given despite a failure being present. According to the severity classification described above those failure modes receive a number "2" rating.

The failure mode according to line 32 of table 15 is rated with value "9" because the disconnection from the high voltage power grid HVG is not conducted in case of a present fire ("LOW" level at input represents a fire in case of single faults analysis).

The same holds for failure modes according to line 37 of table 15 since a connection to the power supply grid HVG is reestablished with a fire being present i.e. the actuator component C4 receives a "LOW" signal which stands for a present fire under the assumption of single system faults.

The failure mode with respect to line 31 of table 15 represents a rating of "2" since the actuator component C4 simply remains open.

The failure mode according to line 36 of table 15 has to be rated with a value "5" event since it is an uncommanded disconnection from the high voltage power grid HVG. For reasons of simplicity failures of the power supplies for the fire sensor components C1, C2 or of the power supply for the CPU component C3 have not been investigated since they form elements outside the relevant system boundary SYS-B.

It is possible to enrich the functional descriptions of the components C with performance attributes such as for instance corresponding time durations. For example maximum durations can be defined. For the exemplary system as illustrated in FIG. 2 the following maximum durations might be given:

Fire sensor components C1 and C2: detection of infrared source and transmitting a signal: 150 ms CPU component C3: processing input signals and commanding output signal: 50 ms Actuator component C4: disconnection from the high voltage power supply grid: 100 ms A further modified safety criterion can be formulated as follows:

"In case of fire the system shall be disconnected from the high voltage power supply grid with a tolerable hazard rate of THF_Fire_1 within one second".

The maximum duration of the coupled functions amounts to 300 ms (150+50+100 ms) which is shorter than one second. As a consequence, the above safety criterion can be met by the system of interest. If the relevant safety criterion indicated a reaction time below 300 ms it would be required to perform amendments on component level or to alter the architecture of the investigated system in order to achieve a shorter overall reaction time which fits to the requirement of the modified safety criterion. In case a remaining time budget as indicated above for safety criterion is provided it is possible to optimize the investigated system. One solution can be that the CPU component C3 evaluates the received fire signals for a longer period of time before commanding a disconnection signal to the actuator component C4. This will reduce the number of false alarms by resorting to mean values.

In a possible embodiment of the method according to the present embodiment of the invention the generated analytical artifact can comprise a Markov chain. This analytical artifact can be required in case that the sequence of events is relevant and a more detailed modeling is required to achieve certain target values. Accordingly, it can be possible to implement a Markov chain logic for the modeling of a safety, reliability or availability related artifact. In this embodiment additional knowledge on system level can be introduced. This can be for instance the fact that the mean down time MDT of the investigated system SYS in case of an undetected fire is significantly longer than those of all other failure states. A corresponding critical sequences can be specified. The Markov chain approach is far-reaching since every fault tree can be described by a Markov chain of first order.

The method according to the present embodiment of the invention for providing an analytical artifact can be formed by a corresponding program or tool to generate one or several analytical artifacts.

With the method according to the present embodiment of the invention it is possible to generate one or more analytical artifacts faster. Moreover the generated analytical artifacts are more precise and have a higher level of consistency. Moreover, the analytical artifacts can be generated with less efforts. The analytical artifacts can be generated by means of any kind of evaluation criterion e.g. a safety, a reliability, an availability or a maintainability criterion. Failure modes can prevent other failure modes from causing failures on system level and can also be recognized in order to receive more precise results of the respective artifacts.

After system definition and selection of the relevant system port states according to the applied evaluation criterion manual steps are no longer required to derive or to generate automatically the analytical artifacts. The method and system can also be applied to dynamic systems of interest. For certain applications the process of selection of the relevant system states may be supported or partly or even totally be conducted automatically.

The complex investigated systems SYS can comprise any kind of technical systems such as production plants, factories, facilities, power distribution systems, vehicles etc. Consequently there is a huge variety of different use cases for the method according to the present embodiment of the invention. In a possible embodiment the generated analytical artifact can be stored for further processing in a memory or database. The generated analytical artifact can be stored in a repository for further use. Moreover the generated analytical artifact can also be processed to monitor and/or control automatically components of the system SYS of interest, the entire system S or a system that comprises the system S depending on an evaluation result of the processed analytical artifact. Accordingly, the embodiment of the invention further provides a system for analyzing, monitoring and/or controlling any kind of technical system of interest which can comprise a plurality of different components. The different components of the investigated system SYS have ports which are connected to each other via wired or wireless links and comprise associated machine readable functional descriptions which may be stored in a local or remote memory. The associated machine readable functional descriptions comprise port definitions and component failure modes descriptions which are processed by a processor to generate automatically at least one analytical artifact. The generated analytical artifact can in turn be processed to analyze, monitor and/or control the system of interest.

In a possible embodiment the analytical artifact can be generated in a development phase of an investigated system consisting components connected to each other according to a stored system model of the developed system. This data model of the investigated system can be stored in a database of the development system. Further, a prototype of the investigated system can be analyzed using analytical artifacts generated automatically by the method according to the present embodiment of the invention. Further, a technical system can also be monitored or even controlled by processing analytical artifacts generated by the method according to the present i embodiment of the invention. When exchanging components C within a system SYS the corresponding analytical artifacts generated for the respective system can be adapted or reconfigured automatically for the new system. Calculation and generation of the analytical artifacts can be performed in a possible embodiment during operation of the investigated system even in real time. The manufactures of the different components C within the system SYS can provide the associated functional descriptions of the respective component C in a possible embodiment online via internet to the analytical system used for analyzing the respective system of interest. In an alternative embodiment the machine readable functional description of the respective component is integrated within local memory of the manufactured component C and can be read out by a processing unit of the analytical system analyzing the investigated system including the respective components.

The invention claimed is:

1. A method for safety control based on generating an analytical artifact used for investigating a technical system of interest comprised of components having associated machine readable functional descriptions including port definitions and component failure mode descriptions, the method comprising:

automatically generating, by a processor, the analytical artifact using the machine readable functional descriptions of the components of the technical system, in response to at least one applied system evaluation criterion, wherein the automatically generating the analytical artifact comprises generating a Markov chain by:

transforming, by the processor, the at least one applied system evaluation criterion into one or more corresponding relevant state patterns at ports forming a system boundary of the system of interest, wherein at least one of the ports is associated with at least one fire sensor that detects fire in a power consumption entity, and by generating, by the processor, the Markov chain on the basis of the relevant state patterns and on the basis of the component failure modes of the components of the system of interest; and disconnecting, by the processor, automatically the components of the technical system depending on an evaluation result of the analytical artifact that is based on input from the at least one port associated with the at least one fire sensor, wherein the technical system comprises the power consumption entity, wherein the disconnecting the power consumption entity includes disconnecting the power consumption entity from a power supply grid.

2. The method according to claim 1 wherein the analytical artifact comprises:

a combination of a fault tree and the Markov chain.

3. The method according to claim 1, wherein the at least one applied system evaluation criterion comprises:

a reliability criterion, an availability criterion, a maintainability criterion, or a safety criterion.

4. The method according to claim 2, comprising:

transforming the at least one applied system evaluation criterion into at least one system state that is represented by a state pattern, applying the at least one state pattern to input ports and output ports of the system boundary of the system of interest, deriving relevant system failure events by automatically taking into account the failure propagation mechanisms based on the functional descriptions of the system's components including their failure mode descriptions, and assembling the derived failure events to generate the fault tree and the Markov chain used as an analytical artifact.

5. The method according to claim 1, wherein the machine readable function description comprises:
port definitions of input and output ports of the component,
component failure modes,
an internal state of the component,
a failure rate,
a maintenance activity,
an inspection interval,
a mean down time, or
a mean time to repair.

6. The method according to claim 1, wherein reactions of the system of interest to single failure modes of the components of the system is determined to generate automatically a FMEA table, a FMECA table or a FMEDA table or parts of those.

7. The method according to claim 1, wherein reactions of the system of interest to single failure modes of the components of the system are determined to generate automatically a FMEA table, a FMECA table or a FMEDA table or parts of those on the basis of an additional predefined failure classification criterion.

8. The method according to claim 4, wherein the at least one applied system evaluation criterion is transformed by a linguistic transformation program into a corresponding binary or multi-level state pattern applied to input ports and output ports in the system boundary or to internal states of the system of interest.

9. The method according to claim 1, wherein the machine readable functional description of a component is defined in OMG® Systems Modeling Language (OMG SysML), Architecture Analysis and Design Language (AADL) or EAST-ADL.

10. The method according to claim 1, wherein the machine readable functional description is stored in a local memory of the component integrated in a component of the system, connected to a port of the component or attached to the component.

11. The method according to claim 1, wherein the machine readable functional description is stored in a remote data storage of a network.

12. The method according to claim 1, wherein the system evaluation criteria are derived from a technical standard and/or from a machine readable contract.

13. The method according to claim 1, wherein the generated analytical artifact is processed to monitor and/or control automatically components of the system of interest depending on an evaluation result of the processed analytical artifact.

14. The method according to claim 1, wherein the components of the system of interest comprise:
hardware components,
software components to be executed by hardware components, and
embedded components.

15. The method according to claim 1, further comprising:
processing, by the processor, the automatically generated analytical artifact to determine an evaluation result; and
controlling, by the processor, the components of the technical system depending on the evaluation result.

16. A system for investigating a technical system of interest comprised of components having ports connected to each other via wired or wireless links and having associated machine readable functional descriptions stored in a local or remote memory and comprising port definitions and component failure mode descriptions, the system comprising:
a processor configured to automatically generate at least one analytical artifact using the machine readable functional descriptions of the components of the technical system, the at least one analytical artifact being processed to analyze, monitor and/or control the system of interest in response to at least one system evaluation criterion input to the processor, wherein the processor is configured to automatically generate the analytical artifact by generating a Markov chain by:
transforming the at least one applied system evaluation criterion into one or more corresponding relevant state patterns at ports forming a system boundary of the system of interest, wherein at least one of the ports is associated with at least one fire sensor that detects fire in a power consumption entity, and by
generating the Markov chain on the basis of the relevant state patterns and on the basis of the component failure modes of the components of the system of interest; and
wherein the processor is configured to disconnect automatically the components of the technical system depending on an evaluation result of the at least one analytical artifact that is based on input from the at least one port associated with the at least one fire sensor, wherein the technical system comprises the power consumption entity,
wherein the disconnecting the power consumption entity includes disconnecting the power consumption entity from a power supply grid.

17. The system of claim 16, wherein the processor is configured to:
process the automatically generated analytical artifact to determine an evaluation result; and
control the components of the technical system depending on the evaluation result.

* * * * *